United States Patent
Mizoguchi

(10) Patent No.: US 6,678,532 B1
(45) Date of Patent: *Jan. 13, 2004

(54) PORTABLE PHONE WITH DETECTING UNIT OF CONTACT OF ANTENNA WITH HUMAN BODY

(75) Inventor: Tamiyuki Mizoguchi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,689

(22) Filed: Nov. 19, 1999

(30) Foreign Application Priority Data

Nov. 19, 1998 (JP) .............................. 10-330037
Oct. 13, 1999 (JP) .............................. 11-290418

(51) Int. Cl.[7] ..................... H04M 1/00; H04Q 11/00; H04Q 7/20; H04Q 1/24
(52) U.S. Cl. ................ 455/550; 455/425; 455/421; 343/702
(58) Field of Search ................ 455/90, 425, 421, 455/67.1, 67.3, 67.6, 550, 566; 343/702

(56) References Cited

U.S. PATENT DOCUMENTS 4,633,519 A * 12/1986 Gotoh et al. ............. 455/277.2
5,408,693 A     4/1995 Alton et al.
5,541,609 A *  7/1996 Stutzman et al. .......... 343/702
5,987,308 A * 11/1999 Ookita ....................... 455/83
6,061,579 A *  5/2000 Arai et al. ................. 455/575
6,097,934 A *  8/2000 Spall et al. .............. 455/575.7
6,122,083 A *  9/2000 Ohta et al. ................ 359/137
6,219,532 B1 * 4/2001 Tanaka et al. ............. 455/78
6,263,190 B1 * 7/2001 Mamori et al. ........... 455/67.1

FOREIGN PATENT DOCUMENTS

| | | |
|---|---|---|
| EP | 0 693 861 A2 | 1/1996 |
| GB | 2 330 965 A | 5/1999 |
| JP | 7-23450 | 1/1995 |
| JP | 7-106999 | 4/1995 |
| JP | 8-172374 | 7/1996 |
| JP | 9-162618 | 6/1997 |
| JP | 9-233016 | 9/1997 |
| JP | 10028169 * | 1/1998 ............ H04M/1/80 |
| WO | WO 91/19367 | 12/1991 |

* cited by examiner

*Primary Examiner*—William Trost
*Assistant Examiner*—Shared Rampuria
(74) *Attorney, Agent, or Firm*—Scully, Scott, Murphy & Presser

(57) ABSTRACT

A portable phone includes an antenna. A detecting circuit detects contact of the antenna with a user or decrease the electric field intensity around of the antenna, and generates a notice signal based on the detecting result. A notifying section notifies to the user, that the antenna contacts the user, in response to the notice signal.

18 Claims, 18 Drawing Sheets

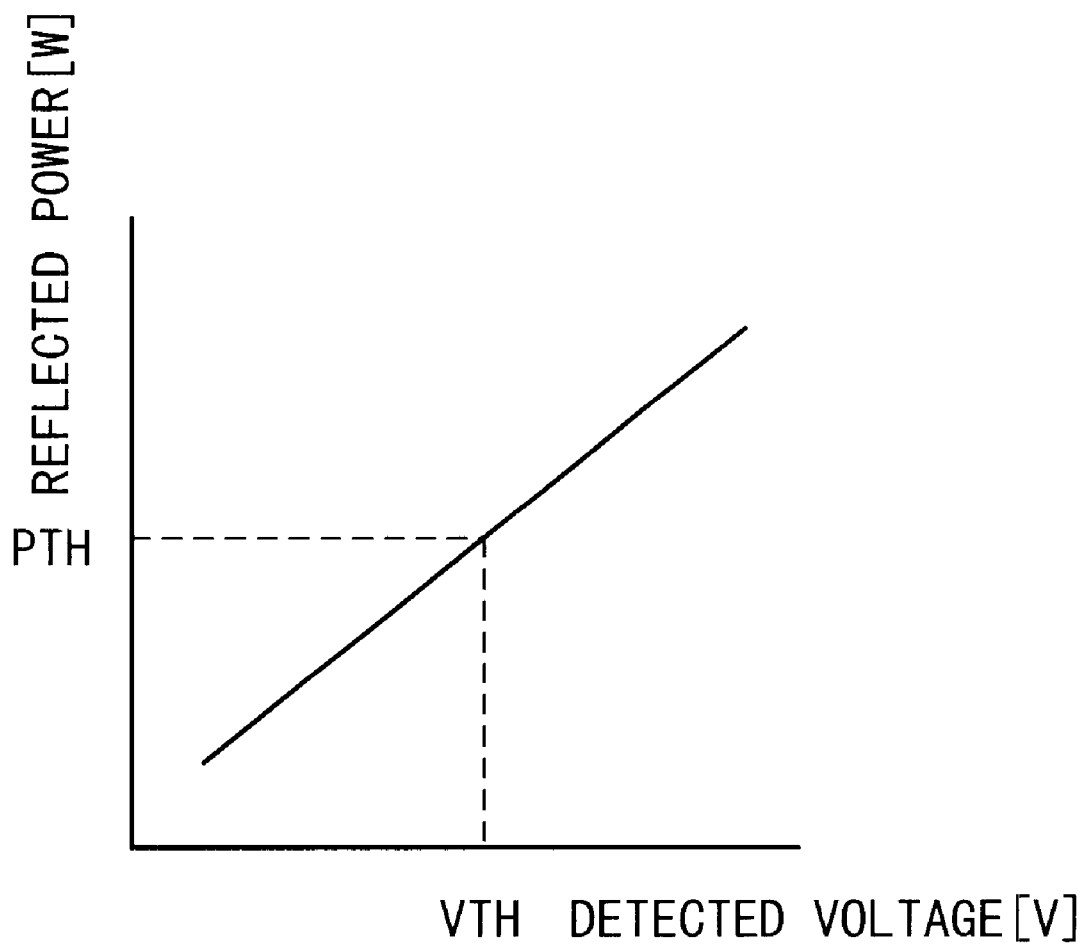

PORTABLE PHONE WITH DETECTING UNIT OF CONTACT OF ANTENNA WITH HUMAN BODY

BACKGROUND OF THE INVENTION

1. Field of the Invention

The present invention relates to a portable phone with a detecting unit of contact of an antenna with a human body.

2. Description of the Related Art

A driving source to operate a portable phone circuit is a battery. There is a limit in the charge capacity of the battery, and the power consumption of the portable phone should be suppressed as less as possible. Also, the power consumption at the time of transmission and reception should be suppressed at a minimum.

It is described in Japanese Laid Open Patent Application (JP-A-Heisei 9-162618) that the impedance of an antenna changes when a human body contacts an antenna electrically connected with a transmitting and receiving circuit.

In case of transmission, when the impedance of the antenna changes, all the power of an amplified transmission signal from the transmitting circuit is not irradiated from the antenna and a part of the amplified transmission signal power is reflected as a reflection power. Such reflection is equivalent to the decrease of the gain of the antenna, and therefore it is impossible to transmit the transmission signal with the enough power to a base station so that the transmission performance is degraded. In case of reception, when the antenna contacts the human body, reception performance is also degraded, because the enough reception power can not be received by the receiving circuit due to the impedance change of the antenna.

The technique in which a special circuit is provided to prevent such degradation of the transmission and reception performance is not limited to the above reference. It is known even in Japanese Laid Open Patent Application (JP-A-Heisei 7-23450), and Japanese Laid Open Patent Application (JP-A-Heisei 7-106999).

Another conventional method is known to prevent the degradation of the transmission and reception performance of an antenna of a portable phone. As shown in FIGS. 1 and 4, such a well known portable phone 100 is composed of one antenna 101 and another antenna 102. The antenna 101 is used for the transmission and reception and the antenna 102 is a receive-only antenna. To switch the antennas 101 and 102 and to use one of the two antennas 101 and 102, it is provided with two high frequency switches 103 and 104. By using such two antennas, antenna switching system diversity reception is made possible. The switching of both antennas is carried out by a CPU 105.

As shown in FIGS. 2A and 2B, in TDMA (Time Division Multiple Access) system, the operating time of the portable phone is composed of a transmission time region S1, a reception time region S2 and an idle time S3. As shown in FIG. 3, steps S101, S102 and S103 are repeated in order. During the idle time S3, an electric field intensity output voltage signal 107 is outputted from a receiving circuit 106 shown in FIG. 4 to the CPU 105. As shown in FIG. 5, an electric field intensity output voltage Va corresponding to the electric field intensity of the antenna and an electric field intensity output voltage Vb corresponding to the electric field intensity of the antenna 102 are compared with each other at a step S104 shown in FIG. 6. The antenna having the larger electric field intensity is selected by the CPU 105.

When the human body contacts such one of two antennas, the antenna switching to prevent the degradation of the transmission and reception performance is lost the original meaning.

Therefore, it is desirable to provide to a portable phone having a function to inform a user of the portable phone that the antenna contacts the body of the user. Also, it is desirable to attain the antenna switching function effectively.

SUMMARY OF THE INVENTION

Therefore, an object of the present invention is to provide a portable phone with a detecting unit, for notifying contact of an antenna with a human body or decrease of an electric field intensity around the antenna.

Another object of the present invention is to provide a portable phone with a detecting unit, in which contact of an antenna with a human body or decrease of an electric field intensity around the antenna can be notified, and a circuit to be added for the notification is simple so that the rise of a manufacturing cost can be suppressed.

Still another object of the present invention is to provide a portable phone with a detecting unit, in which contact of an antenna with a human body or decrease of an electric field intensity around the antenna can be notified to utilize an antenna switching function effectively.

In order to achieve an aspect of the present invention, a portable phone includes an antenna, a detecting circuit and a notifying section. The detecting circuit detects at least one of contact of the antenna with a user of the portable phone and decrease of an electric field intensity around the antenna, and generates a notice signal based on the detecting result. The notifying section notifies the user of the contact of the antenna with the user in response to the notice signal.

Here, the detecting circuit may detect the contact of the antenna with the user based on power of a reflected signal from the antenna when a transmission signal is supplied to the antenna.

Also, the detecting circuit may detect a voltage of a reflected signal from the antenna when a transmission signal is supplied to the antenna, and detects the contact of the antenna with the user when the detected voltage is equal to or larger than a predetermined value. In this case, the predetermined value can be previously settable by the user.

Also, the detecting circuit may detect impedance change of the antenna and detects the contact of the antenna with the user based on the detected impedance.

Also, the detecting circuit may detect the contact of the antenna with the user during transmission of a transmission signal via the antenna. In this case, the portable phone may further includes a transmitting circuit, a receiving circuit, a high frequency switch selectively connecting the antenna to one of the receiving circuit and the transmitting circuit, and a circulator connecting the high frequency switch with one of the detecting circuit and the transmitting circuit. Also, the circulator includes a 3-input and 1-output circuit, wherein the detecting circuit is connected with the high frequency switch but is not connected with the transmitting circuit, and the transmitting circuit is connected with the high frequency switch but is not connect with the detecting circuit, and the high frequency switch is connected with the detecting circuit but is not connected with the transmission circuit.

Also, the notifying section preferably includes at least one of a vibrator, a speaker and an LED.

Also, it is preferable that the detecting circuit stops the generation of the notice signal when the antenna is separated from the user, or when the electric field intensity is increased.

Also, the detecting circuit may detects the electric field intensity around the antenna, and generates the notice signal when the detected electric field intensity is lower than a reference electric field intensity.

Also, the portable phone may further include an additional antenna. In this case, the detecting circuit detects an electric field intensity around the additional antenna, and uses the detected electric field intensity around the additional antenna as the reference electric field intensity.

Also, the detecting circuit may detect the electric field intensity around the antenna and the reference electric field intensity for each of a plurality of transmission frames, and calculates a difference between the number of the electric field intensities equal to or larger than the reference electric field intensities and the number of the electric field intensities smaller than the reference electric field intensities, and generates the notice signal when the calculated difference is equal to or larger than a predetermined value.

Also, the detecting circuit includes a counter. In this case, the detecting circuit may count up the counter when the electric field intensity is equal to or larger than the reference electric field intensity, and count down the counter when the electric field intensity is smaller than the reference electric field intensity. Alternatively, the detecting circuit may count up the counter when the electric field intensity is equal to or larger than the reference electric field intensity, and count down the counter when the electric field intensity is smaller than the reference electric field intensity, and when the electric field intensity is equal to or smaller than a reference value.

Also, the detecting circuit may detect the electric field intensities around the antenna and the reference electric field intensities over a plurality of transmission frames, and calculate a first average of the detected electric field intensities and a second average of the detected reference electric field intensities, and generate the notice signal when the first average is lower than the second average.

In order to achieve another aspect of the present invention, a method of notifying degradation of communication quality in a portable phone, includes:

detecting at least one of contact of an antenna with a user of the portable phone and decrease of an electric field intensity around the antenna;

generating a notice signal based on the detecting result; and notifying that the antenna contacts the user, to the user in response to the notice signal.

Here, it may be detected based on power of a reflected signal from the antenna that the antenna contacts the user, when a transmission signal is supplied to the antenna, and the notice signal may be generated based on the detection.

Also, a voltage of a reflected signal from the antenna may be detected when a transmission signal is supplied to the antenna, and it may be detected that the antenna contacts the user when the detected voltage is a predetermined value. In this case, the predetermined value may be preset by the user.

Also, impedance change of the antenna is detected, and it may be detected based on the detected impedance change that the antenna contacts the user.

Also, it may be detected during transmission of a transmission signal via the antenna that the antenna contacts the user. In this case, the antenna is selectively connected to the transmitting circuit, and the high frequency switch may be connected with the transmission signal.

Also, it may be notified by use of at least one of a vibrator, a speaker and an LED that the antenna contact with the user.

Also, when the antenna does not contact the user, the generation of the notice signal may be stopped.

Also, in the detecting step, the electric field intensity around the antenna is detected, and the notice signal is generated when the detected electric field intensity is lower than a reference electric field intensity.

Also, an electric field intensity around an additional antenna is detected, to use the detected electric field intensity around the additional antenna as the reference electric field intensity.

Also, in the detecting, the electric field intensity around the antenna and the reference electric field intensity may be detected for each of a plurality of transmission frames, a difference between the number of the electric field intensities equal to or larger than the reference electric field intensities and the number of the electric field intensities smaller than the reference electric field intensities may be calculated, and the notice signal may be generated when the calculated difference is equal to or larger than a predetermined value.

Also, an electric field intensity around the additional antenna may be detected to use the detected electric field intensity around the additional antenna as the reference electric field intensity.

Also, in the detecting, the counter may be counted up when the electric field intensity is equal to or larger than the reference electric field intensity, and the counter may be counted down when the electric field intensity is smaller than the reference electric field intensity.

Alternatively, in the detecting, a counter may be counted up when the electric field intensity is equal to or larger than the reference electric field intensity, and the counter may be counted down when the electric field intensity is smaller than the reference electric field intensity, and when the electric field intensity is equal to or smaller than a reference value.

Instead, in the detection, the electric field intensities around the antenna and the reference electric field intensities may be detected over a plurality of transmission frames, and a first average of the detected electric field intensities and a second average of the detected reference electric field intensities may be calculated, and the notice signal may be generated when the first average is lower than the second average.

BRIEF DESCRIPTION OF THE DRAWINGS

FIG. 12 is a graph showing relation between reflected power and a detected voltage;

DESCRIPTION OF THE PREFERRED EMBODIMENTS

A portable phone with a detecting unit of contact of an antenna with a human body will be described below in detail with reference to the attached drawings. In the present invention, the word "contact" means direct contact and the influence to an antenna through approach of an object such as a human body.

Figure 7:
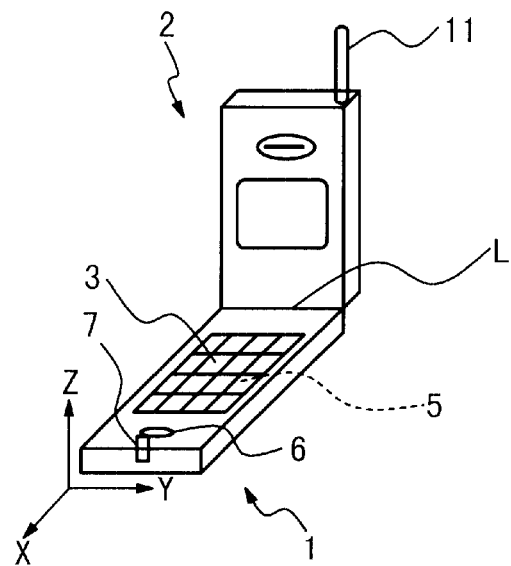
FIG. 7 is a perspective view of a portable phone with a detecting unit of contact of an antenna with a human body according to an embodiment of the present invention.

FIG. 7 shows the portable phone with the detecting unit according to the embodiment of the present invention. Referring to FIG. 7, the portable phone is composed of the first section 1 and a second section 2. The second section 2 is combined to the first section 1 by a hinge as a central rotation axis L which extends in parallel to the Y axis. The first section 1 and the second section 2 are turnable from each other around the rotation center axis L. The opening angle between the first section 1 and the second section 2 is in a range from zero degree to about 180 degrees. When the first section 1 and the second section 2 are folded, the Z axis is oriented to the direction of the thickness of the first section 1 and the second section 2.

Figure 8:
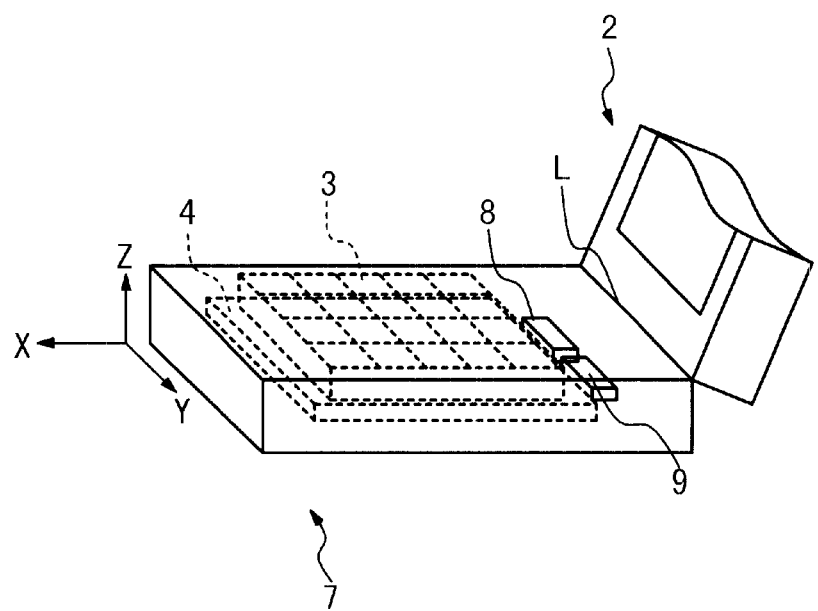
FIG. 8 is a perspective view of the detecting unit from a different direction.

The first section 1 is provided with a key button sheet 3 on the side of the opposing surface of the first section 1 to the closed second section 2 (parallel to the x-y plane). The key button sheet 3 is provided with a plurality of key buttons for generating signals indicative of data and signals for controls of the portable phone when the buttons are pushed. A light directing plate 4 is arranged on the back side of the key button sheet 3, as shown in FIG. 8. The light directing plate 4 is used as a light source to illuminate the key buttons.

A vibrator 5 (not shown) is provided in the first section 1. A microphone 6 is arranged at a position on the first section 1 distanced from the rotation center axis L. An LED 7 is arranged near the microphone 6 for call arrival display. As shown in FIG. 8, a green LED 8 and a red LED 9 for a notifying operation to be mentioned later are arranged on positions on the first section 1 near to the rotation center axis L. The key button sheet 3, the microphone 6, the green LED 8, and the red LED 9 form a part of the opposing surface on the first section 1.

As shown in FIG. 7, an antenna 11 for the transmission and reception is provided for the second section 2. The antenna 11 can be extended from the position on the second section 2 distanced from the central rotation axis L into an outside direction apart from the second section 2. A part of the antenna shown in FIG. 7 is a picking portion for accommodating in the second section 2 and picking out the antenna.

A speaker 12 is arranged at a position of the second section 2 distanced from the rotation center axis L. The speaker 12 forms a part of the opposing surface of the second section to the closed first section 1. While the portable phone is used, the opposing surface of the second section is inclined by about 120 degrees to about 150 degrees with respect to the opposing surface of the first section 1 around the Z axis and. In addition, a display is provided on the center portion of the opposing surface of the second section 2.

Figure 9:
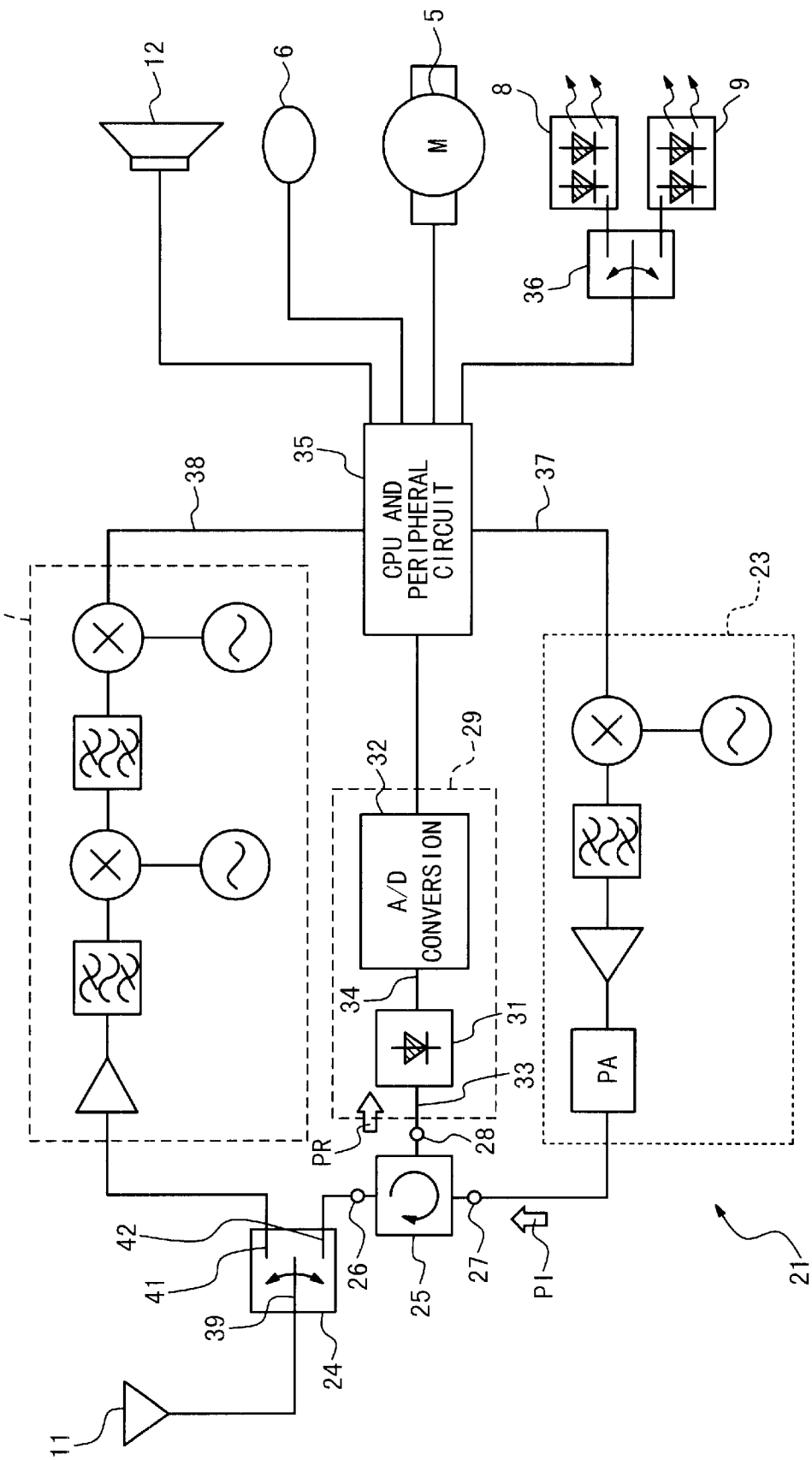
FIG. 9 is a circuit diagram showing the portable phone with the detecting unit of contact of the antenna with the human body according to the first embodiment of the present invention.

FIG. 9 shows a telephone circuit 21 of the portable phone with the detecting unit of contact of the antenna with the human body according to the first embodiment of the present invention. Referring to FIG. 9, the telephone circuit 21 is provided with a receiving circuit 22 and a transmitting circuit 23. The antenna 11 functions as an element for transmitting and receiving electromagnetic wave in case of the transmission and reception, and is connected with either of the receiving circuit 22 and the transmitting circuit 23 through a high frequency switch 24.

The high frequency switch 24 switches between a contact to make the antenna 11 connect with the receiving circuit 22 and a contact to make the antenna 11 connect with the transmitting circuit 23 in accordance with the timings of the transmission and the reception. A circulator 25 is newly added in the present invention. The circulator itself is a known element. The circulator 25 is a 3-1 connector and has three connection ports. The circulator 25 passes the high frequency signal into a predetermined direction.

Figure 10:
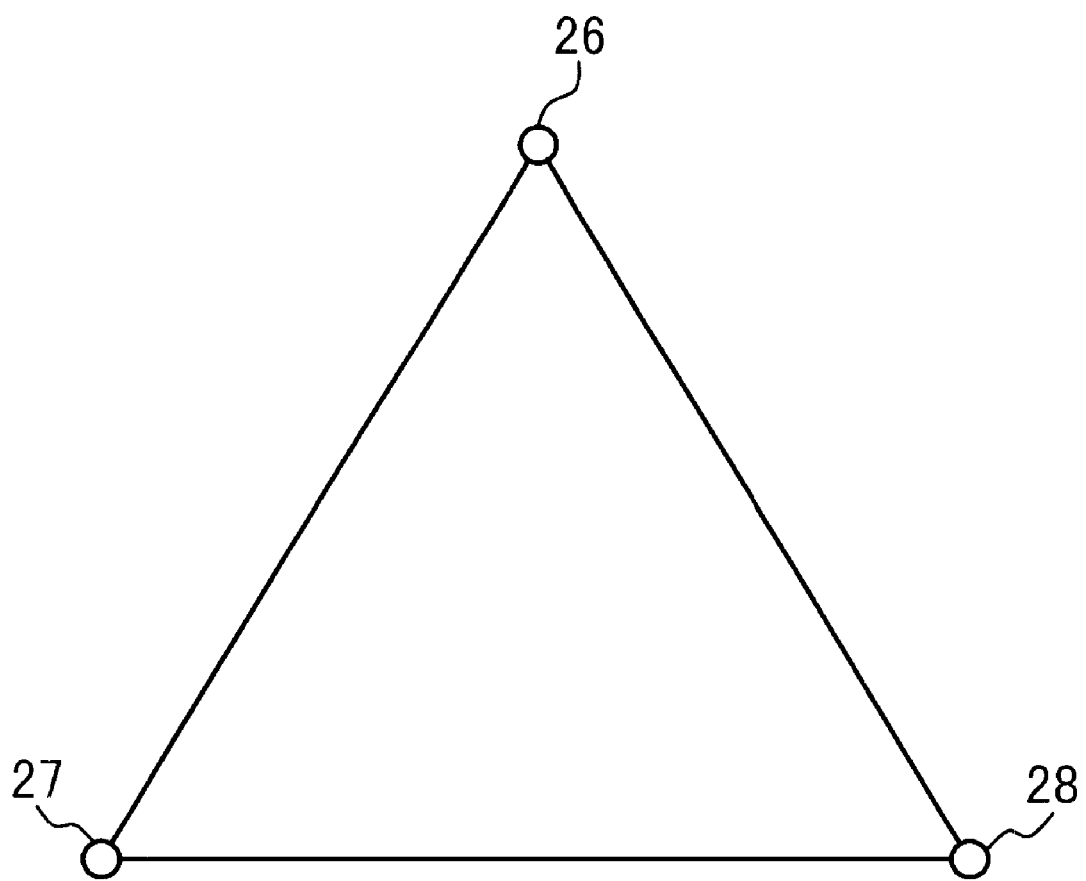
FIG. 10 is a diagram showing the function of a circulator used in the portable phone with the detecting unit according to the first embodiment of the present invention.

Referring to FIG. 10, one is a port 26 of the side of the high frequency switch 24, another is a port 27 of the side of the transmitting circuit 23 and the other one is a port 28 of the side of the human body contact detecting circuit 29. The detecting circuit 29 will be mentioned later. The signal which has been inputted to the port 27 of the side of the transmitting circuit 23 is outputted to the port 26 of the side of the high frequency switch 24 but is not outputted to the port 28 of the side of the detecting circuit 29. The signal which has been inputted from the port 26 of the side of the high frequency switch 24 is outputted to the port 28 of the side of the detecting circuit 29 but is not outputted to the port 27 of the side of the transmitting circuit 23. The signal which has been inputted to the port 28 of the side of the detecting circuit 29 is outputted to the port 27 of the side of the transmitting circuit 23 but is not outputted to the port 26 of the side of the high frequency switch 24. FIG. 10 is a vector representation of such a 3-1 circulator.

The detecting circuit 29 is composed of a direct current detector 31 and an analog-to-digital converter 32. The direct current detector 31 detects a high frequency signal 33 outputted from the port 28 on the side of the detecting circuit 29 and converts the detected high frequency signal 33 into a direct current voltage signal 34. The analog-to-digital converter 32 converts the direct current voltage value 34 as the output of direct current detector 31 into a digital value.

A CPU and peripheral circuit 35 are connected with the receiving circuit 22. The CPU and peripheral circuit 35 have the function to monitor and control the telephone circuit 21 and operates based on a software. The operations of the speaker 12, microphone 6, vibrator 5, green LED 8, and red LED 9 described above are controlled by the CPU and peripheral circuit 35.

The speaker 12 can send a reception signal to the ear of the user as sound, the microphone 6 can collect voice of the user and the vibrator 5 can conduct vibration to the user. The green LED and the red LED 9 are connected with the CPU and peripheral circuit 35 through a switch 36. The switch 36 switches between the green LED 8 and the red LED 9 as the back light source of the key button sheet 3.

The sound of the user at the time of the communication is collected by the microphone 6, is converted into a digital signal by the CPU and peripheral circuit 35. The digital signal is supplied to the transmitting circuit 23 as a modulation signal 37. The modulation signal 37 is modulated by the transmitting circuit 23, is subjected to frequency conversion, amplified in power, and is supplied to the port 27 of the circulator 25 on the side of the transmitting circuit 23. The signal passes through the port 26 on the side of the high frequency switch 24 and is radiated as the electromagnetic wave from the antenna 11. The transmitter 23 is a well known circuit.

A transmission signal transmitted from the portable phone base station is received by the antenna 11. The reception signal received by the antenna 11 is inputted to the receiving circuit 22 through the high frequency switch 24. After amplification and frequency conversion, the signal is outputted as a demodulation signal 38 from the receiving circuit 22. The demodulation signal 38 is converted into a sound by the CPU and the peripheral circuit 35 and is outputted from the speaker 12.

The high frequency switch 24 has 3 contacts. In case of the reception, a contact 39 for the antenna and a contact 41 on the side of the receiving circuit 22 are connected to be set to the conductive state. In case of the transmission, the contact 39 for the antenna and a contact 42 on the side of the transmitting circuit 23 are connected to be set to the conductive state. Such timings of switching connection, i.e., the timings of the transmission and reception are controlled in accordance with the classification of the system of the portable phone such as the TDMA (Time-Division-Multiple-Access) system.

Figure 11A:
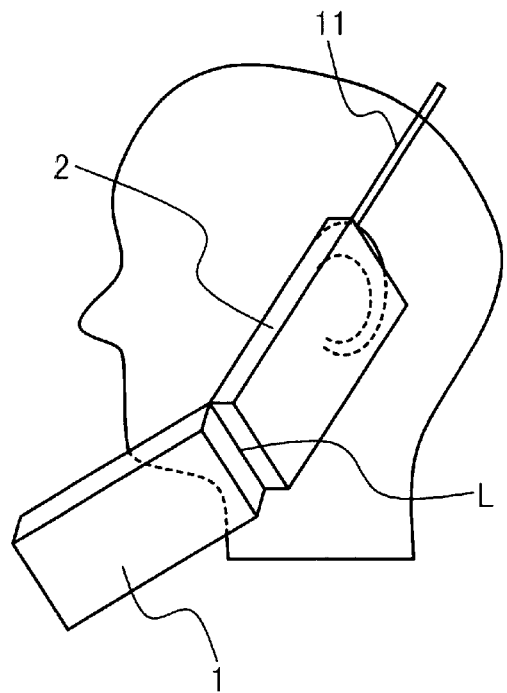
FIGS. 11A and 11B are views showing two use ways of the portable phone, respectively.
Figure 11B:
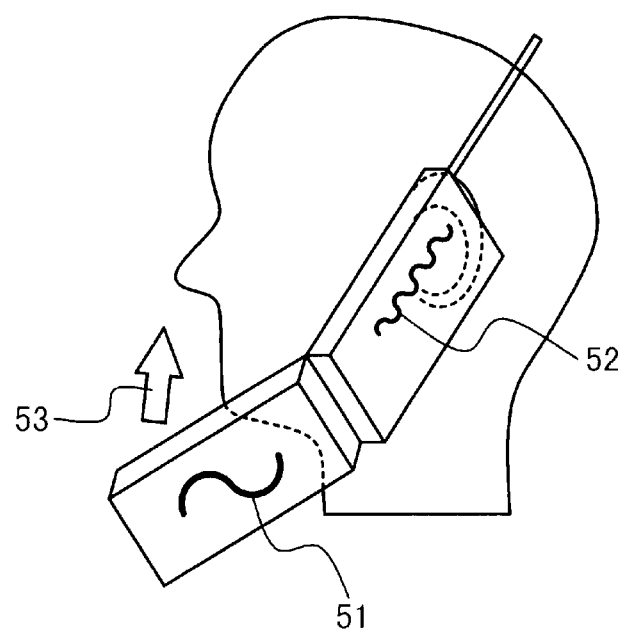

The high frequency power signal Pi (shown in FIG. 9 by a white thick arrow) which has been sent out at the timing of the transmission during the communication passes through the high frequency switch 24 and is radiated as the electromagnetic wave from the antenna 11. FIGS. 11A and 11B show two ways of the contact of the antenna with the user and a way of notifying the user contact. The folding type portable phone is easy for the opposing surface of the first section 1 to contact the jaw of the user. While pushing the speaker 12 of the second section 2 against the ear of the user, the antenna 11 in the extended state is easy to contact the hair and ear of the user.

The impedance of the antenna 11 changes when the antenna 11 contacts the user. Therefore, all the power of high frequency power signal Pi can not be supplied to the antenna and a part thereof is reflected as a reflection power Pr (shown in FIG. 9 by the white thick arrow). Such reflection is equivalent to decrease of the gain of the antenna 11. Thus, enough power cannot be transmitted to a base station and the degradation of the transmission performance is caused.

When the antenna contacts the user in case of the reception, the enough reception power cannot be received by the receiving circuit 22 due to the impedance change of the antenna 11. Therefore, the reception performance degradation is caused.

The reflection power Pr which has been reflected in the transmission due to the impedance change of the antenna 11 is detected by the direct current detector 31 of the detecting circuit 29. Then, the detected reflection power Pr is converted into a detection voltage V as a direct current voltage signal 34. FIG. 12 shows relation between the reflection power and the detection voltage. The relation of a reflection power quantity W on the vertical axis and the detection voltage V on the horizontal axis is linear generally. The detection voltage increases in accordance with the reflection power quantity.

The output voltage 34 of the direct current detector 31 is converted into a digital form by the analog-to-digital converter 32 and is recognized by the CPU 35. In this way, the reflection power W due to the contact of the user with the antenna can be electrically recognized as the direct current voltage value. When the detection voltage value recognized by the CPU 35 exceeds a predetermined threshold Vth shows in FIG. 12, the CPU 35 determines that the reflection electric power quantity W became larger than a predetermined threshold Pth, and notifies an alarm to the user to avoid the degradation of the transmission performance.

The threshold to secure the transmission performance is predetermined from a theory value or a experiment value, and is stored in a memory (not shown) for the CPU 35. However, the threshold may be preset to a proper value in a predetermined range by the user. When the CPU 35 has recognized that reflection power quantity W has exceeded the threshold Pth, the CPU 35 controls the speaker 12, the vibrator 5, the green LED 8, and the red LED 9 to notify the contact of the user with the antenna to the user. It is possible to select, based on the presetting by the user, whether the notifying operation should be carried out and which element (s) 12, 5, 8 and 9 should be used when the notifying operation should be carried out. Therefore, a program with a freedom can be provided.

The light source elements such as the green LED 8 and the red LED 9 function as a back light to direct the light through the light directing plate 4 and to illuminate of the back surface of the key button sheet 3, as shown in FIG. 8. In case of key button operation before the communication starts, the switch 36 is controlled to drive the green LED 9.

A comparison voltage Vth may be previously given in a hardware manner to be compared with the detection voltage, when a comparator is used as the analog-to-digital converter 32. In this case, whether or not the antenna 11 contacts the user is transferred as a digital signal of 1 or 0 to the CPU 35. The high frequency switch 24 can be made to have a structure of a filter which is used in common for the transmission and reception. Also, the high frequency switch 24 is possible to be used for not only the FDMA (Frequency Division Multiple Access) system of an analog portable phone but also the TDMA system. Moreover, the notifying operation are possible to be realized by use of the turning on or off of the arrival signal LED 7 shown in FIG. 7 as another method.

Figure 13:
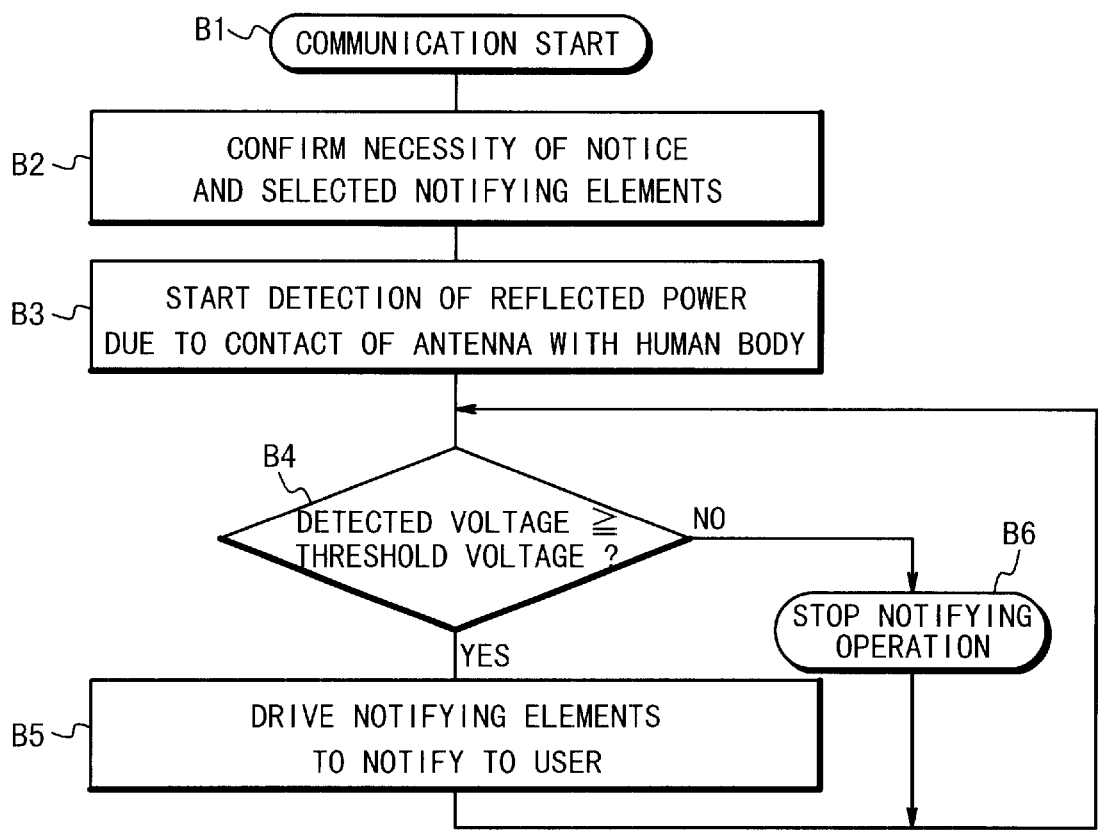
FIG. 13 is a flow chart showing a circuit operation.

FIG. 13 shows the operation which contains an operation of the user. Referring to a flow chart shown in FIG. 13, in the detecting operation of the contact of the user with the antenna 11 and the notifying operation to the user, the CPU 35 executes a software to request the user to confirm the initial setting stored in the memory in a step B2 with respect to whether or not the notifying operation should be carried out when the antenna 11 contacts the user and which of notifying elements should be selected when the notifying operation should be carried out, after the communication is started by the user. As shown in FIG. 11B, the notifying element of the vibration 51 of the second section 2, notifying sound 52 from the second section 2 and the LED lighting 53 can be freely set by the user.

In a step B3, a detection voltage value of the reflection power Pr starts to be monitored. In a step B4, the comparing operation is carried out of whether or not the detection voltage value exceeds the threshold Vth. When the detection voltage value exceeds the threshold Vth, it is recognized that the antenna 11 contacts the user. Then, the notifying elements are driven in a step B5. After the drive, the control returns to the step B4, and the detection voltage is continuously monitored. When the detection voltage value falls less than the threshold, the notifying operation is stopped in a step B6. After the notifying operation is stopped, the control returns to the step B4 again. In this way, the notifying operation notifying the contact of the user with the antenna is carried out in real time, and it becomes possible to promote actual attention of the user.

Figure 14:
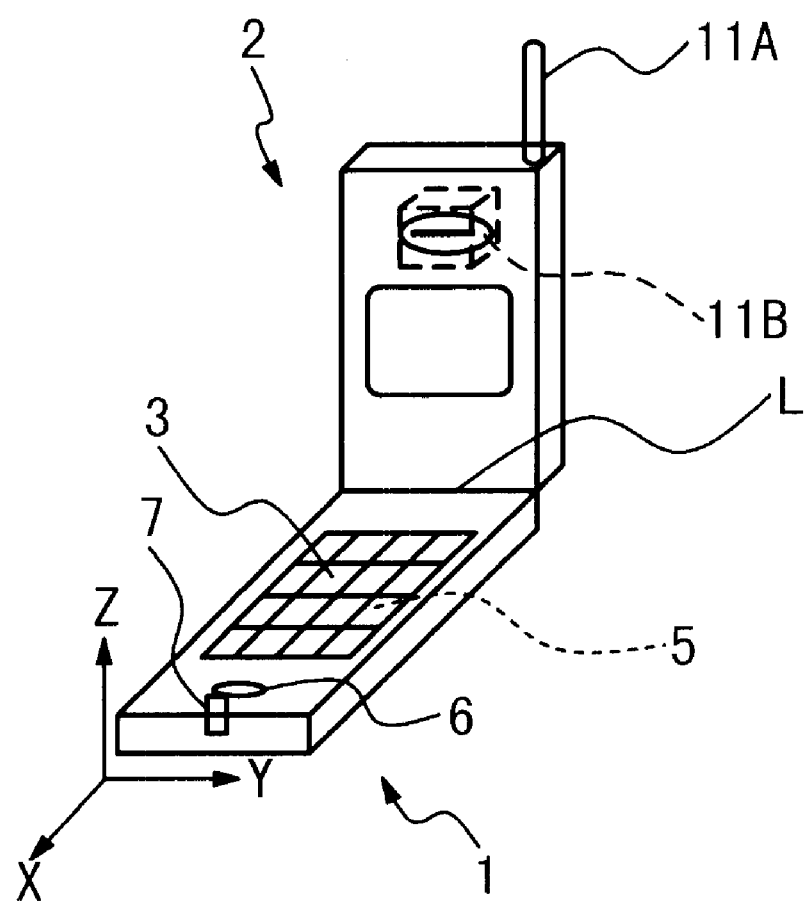
FIG. 14 is a perspective view of the portable phone with a detecting unit of contact of a human body with an antenna according to a second embodiment of the present invention.

FIG. 14 shows the portable phone with the detecting unit according to the second embodiment of the present invention. In the portable phone in this embodiment, a second antenna 11b as another antenna is added to the portable phone shown in FIG. 7. The antenna 11 of FIG. 7 is shown by 11a in FIG. 14.

The portable phone in this embodiment is the same as the portable phone of FIG. 7 in the following points. That is, a vibrator 5 is provided into the first section 1. A microphone 6 is provided at a position of the first section 1 distanced from the central rotation axis L. An LED 7 for arrival display is arranged near the microphone 6. A green LED 8 for notifying and a red LED 9 for notifying are arranged at the positions near the central rotation axis L. Also, a key button sheet 3, the microphone 6, the green LED 8 for notifying, and the red LED 9 for notifying are formed as a part of the opposing surface of the first section 1.

Also, the portable phone in this embodiment is the same as the portable phone of FIG. 7 in the following point. That is, the antenna 11 for the transmission and reception is provided for the second section 2. The antenna 11 can be extended from the position of the second section 2 distanced from the central rotation axis L into a direction away from the second section 2. Also, the portable phone in this embodiment is the same as the portable phone of FIG. 7 in the following point that a speaker 12 is arranged at the position of the second section 2 further distanced from the central rotation axis L, and forms as a part of the opposing surface of the second section 2. A second antenna 11b is embedded in the second section 2 in principle.

Figure 15:
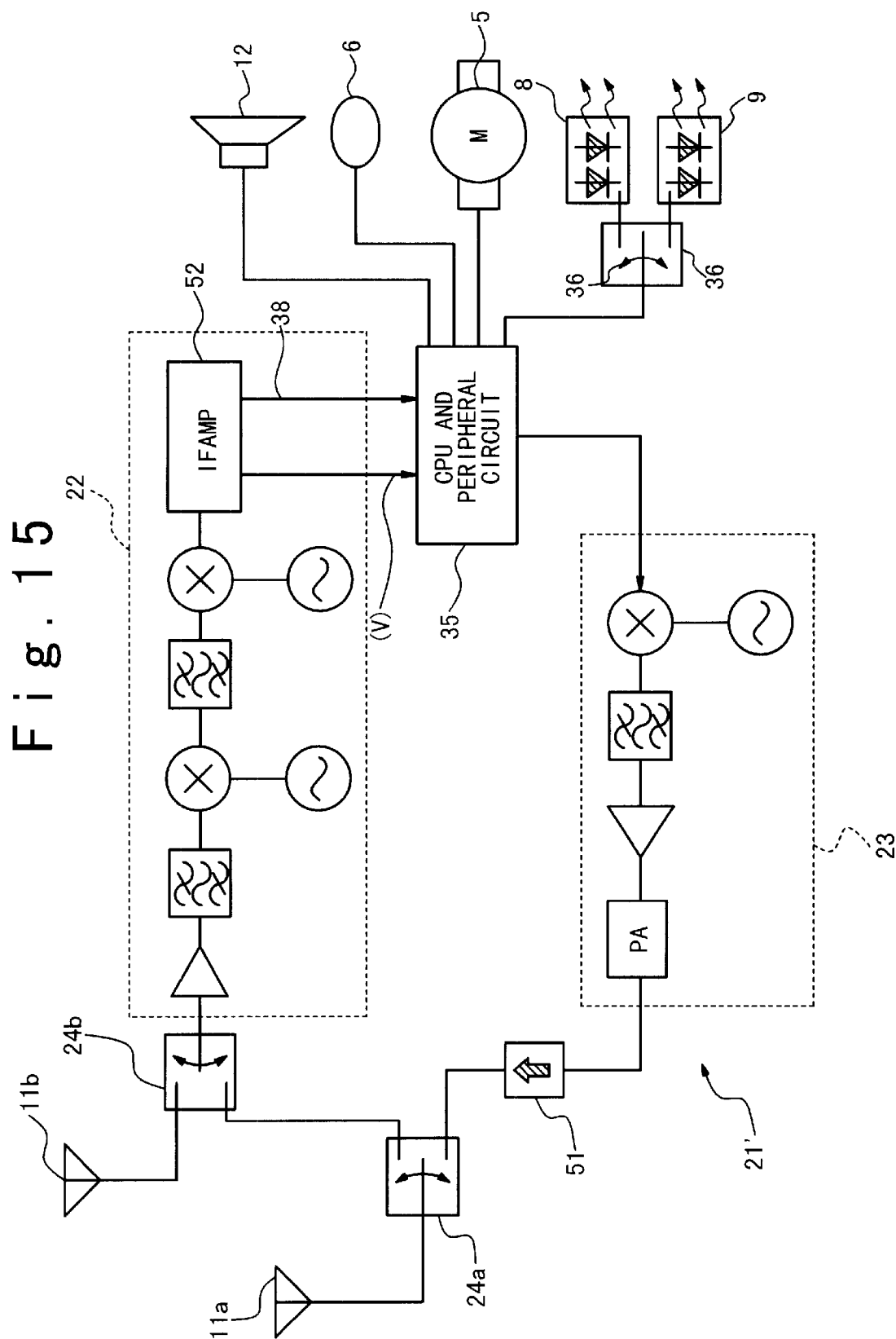
FIG. 15 is a circuit diagram showing the structure of the portable phone with the detecting unit according to the second embodiment of the present invention.

FIG. 15 shows the telephone circuit 21' in the second embodiment in which the detecting circuit for detecting contact of an antenna 11a with a human body is incorporated and to which the second antenna 11b is added. The telephone circuit 21' is provided with a receiving circuit 22 and a transmitting circuit 23. The first antenna 11a as the element used at the time of the transmission and reception is connected with either of the receiving circuit 22 and the transmitting circuit 23 through a first high frequency switch 24a and a second high frequency switch 24b.

The second high frequency switch 24b has a contact to connect of the receive-only second antenna 11b with the receiving circuit 22 in case of the reception. The first high frequency switch 24a has a contact to connect the transmitting circuit 23 with the first antenna 11a in transmission, and a contact to connect the first antenna 11a with the receiving circuit 22 through the second high frequency switch 24b in case of the reception. The second high frequency switch 24b have the contact to connect the first antenna 11a with receiving circuit 22 through the first high frequency switch 24a in case of the reception.

An isolator 51 is interposed between the transmitting circuit 23 and the first high frequency switch 24a. The flow of current from transmitting circuit 23 to the first high frequency switch 24a is permissible by the isolator 51. However, the isolator 51 prevents the flow of current from the first high frequency switch 24a to the transmitting circuit 23.

A CPU and peripheral circuit 35 are connected with the receiving circuit 22. The CPU and peripheral circuit 35 operate based on a software and have the function to monitor and control the telephone circuit 21'. The speakers 12, the microphones 6, the vibrators 5, the green LED 8 for notifying, the red LED 9 for notifying as mentioned above are controlled by the CPU and peripheral circuit 35.

A transmission signal transmitted from a portable phone base station is received by the first antenna 11a or the second antenna 11b. The received signal by the first antenna 11a or the second antenna 11b is supplied to the receiving circuit 22 through the high frequency switches 24a and 24b. After amplification and frequency conversion, the signal is outputted as a demodulated signal 38 from the receiving circuit 22. The demodulated signal 38 is converted into sound by the CPU and peripheral circuit 35 and is outputted by the speaker 12.

Figure 1:
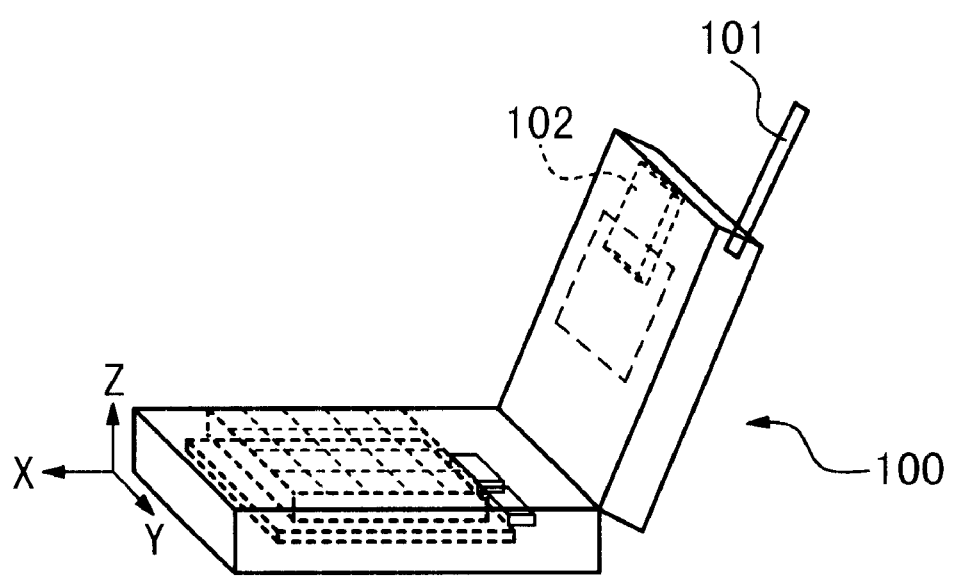
FIG. 1 is a perspective view of a conventional portable phone.
Figures 2A, 2B:
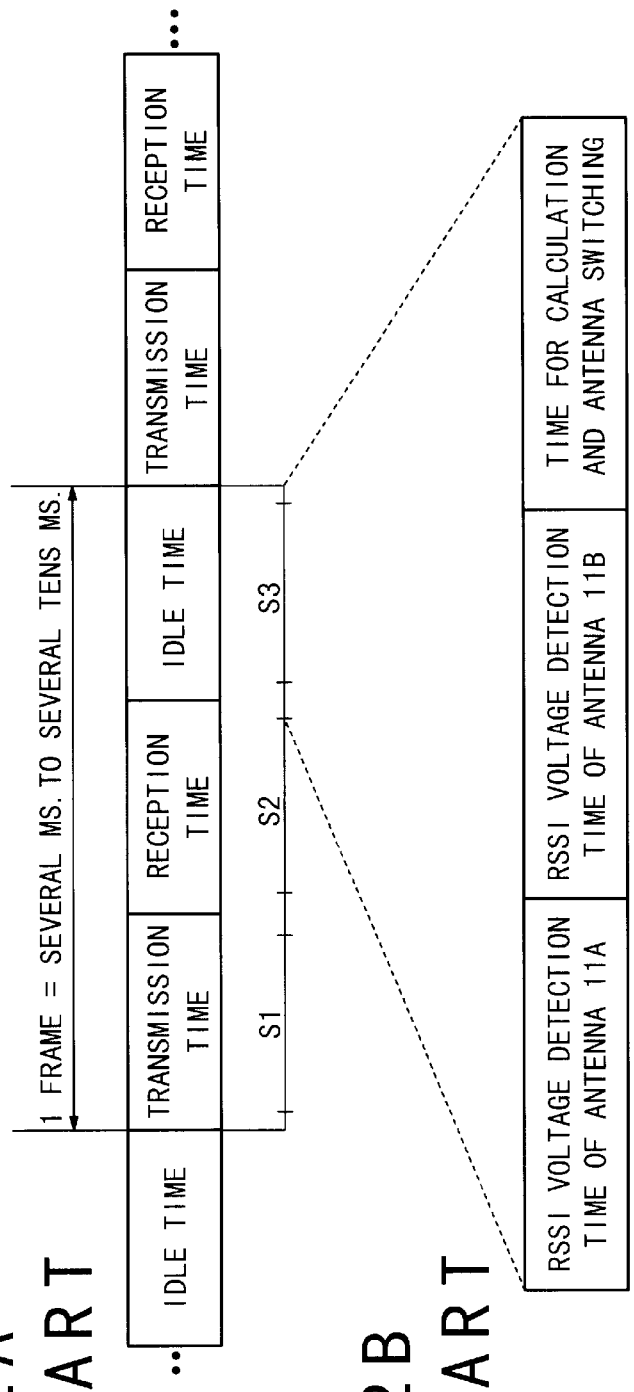
FIGS. 2A and 2B are a communication frame structure used in a portable phone and an idle time of the communication frame.
Figure 3:
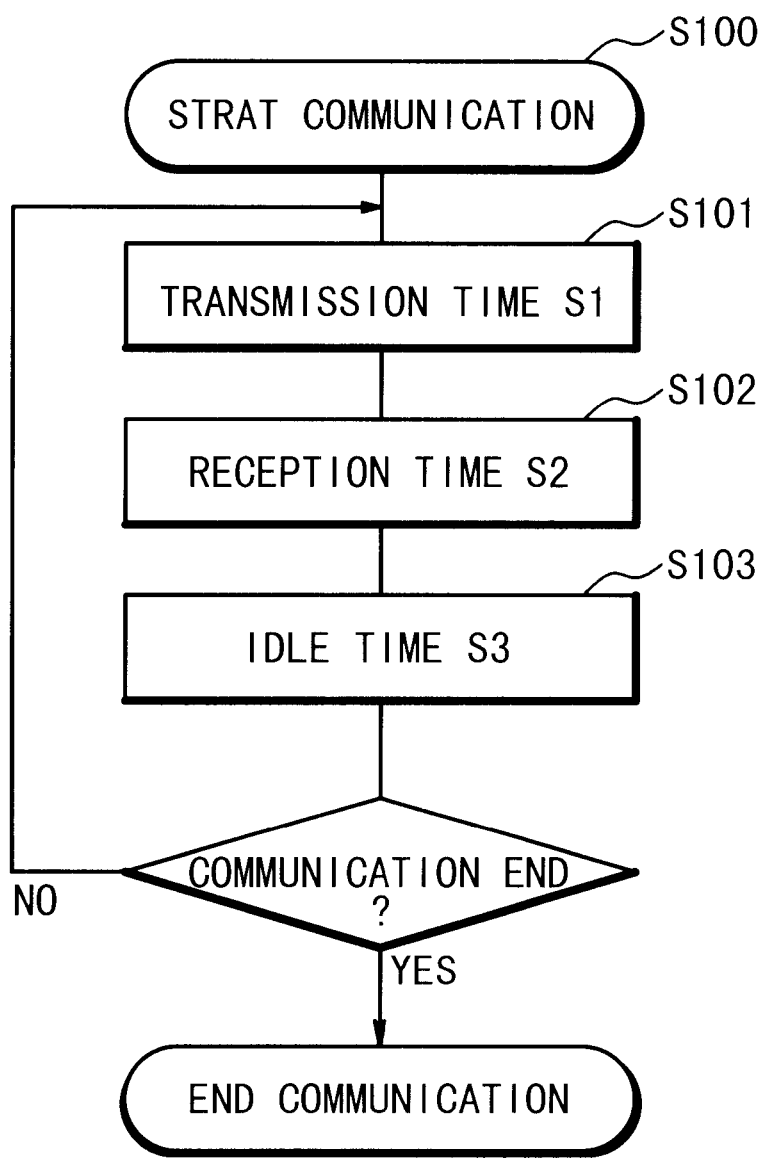
FIG. 3 is a flow chart showing an operation of the conventional portable phone.
Figure 4:
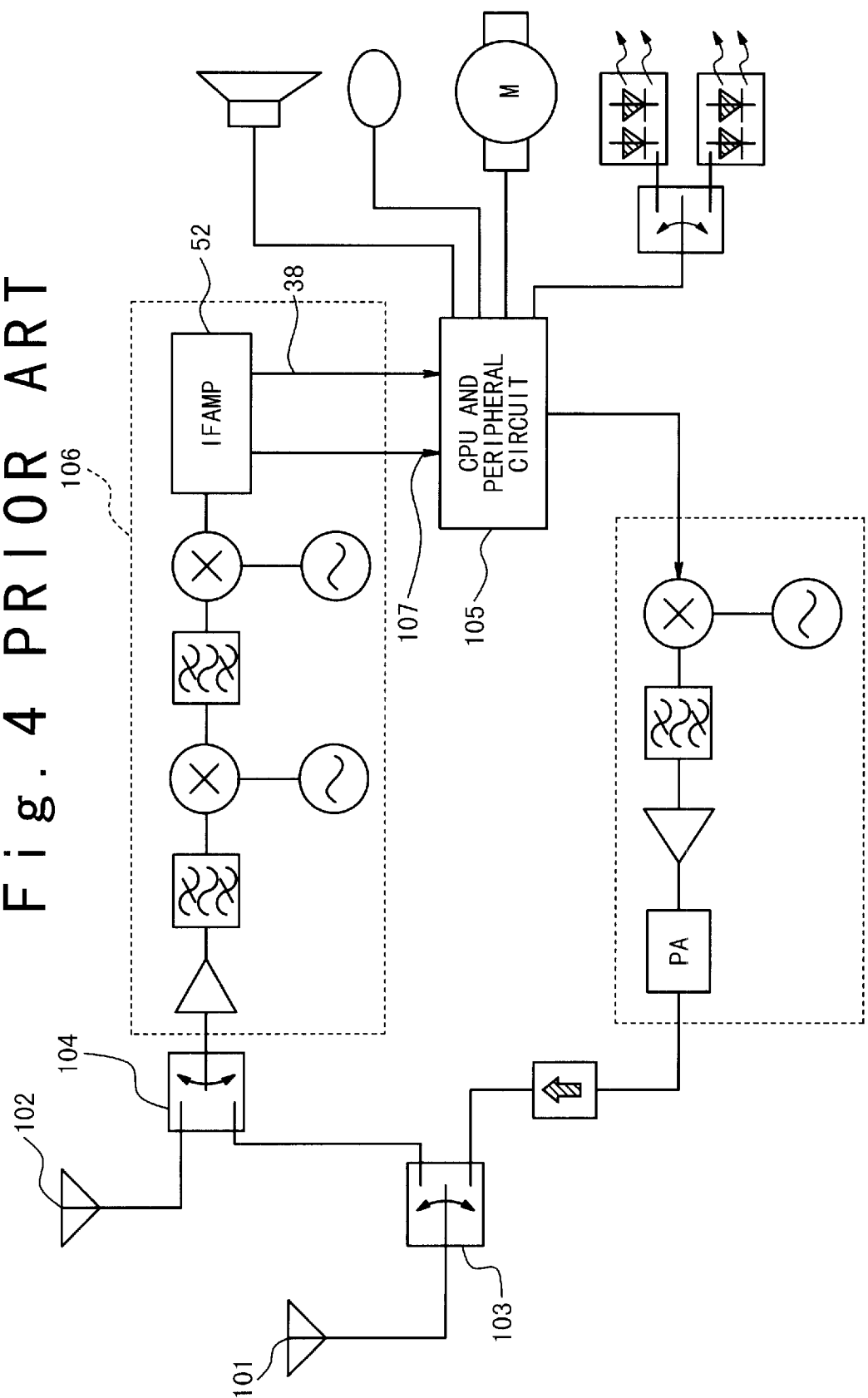
FIG. 4 is a circuit diagram showing the structure of the conventional portable phone.

The receiving circuit 22 is composed of an IF amplifier 52. The IF amplifier 52 has the function to output the electric field intensity detection voltage corresponding to the electric field intensity around the antenna, as in the conventional receiving circuit. The idle time S3 shown in FIGS. 2A and 2B is composed of the time for which the electric field intensity detection voltage V1 corresponding to the electric field intensity E1 in the first antenna 11a is detected, the time for which the electric field intensity detection voltage V2 corresponding to the electric field intensity E2 in the second antenna 11b is detected, and the time required to compare the electric field intensity detection voltages V1 and V2 and to switch the antennas.

Figure 16:
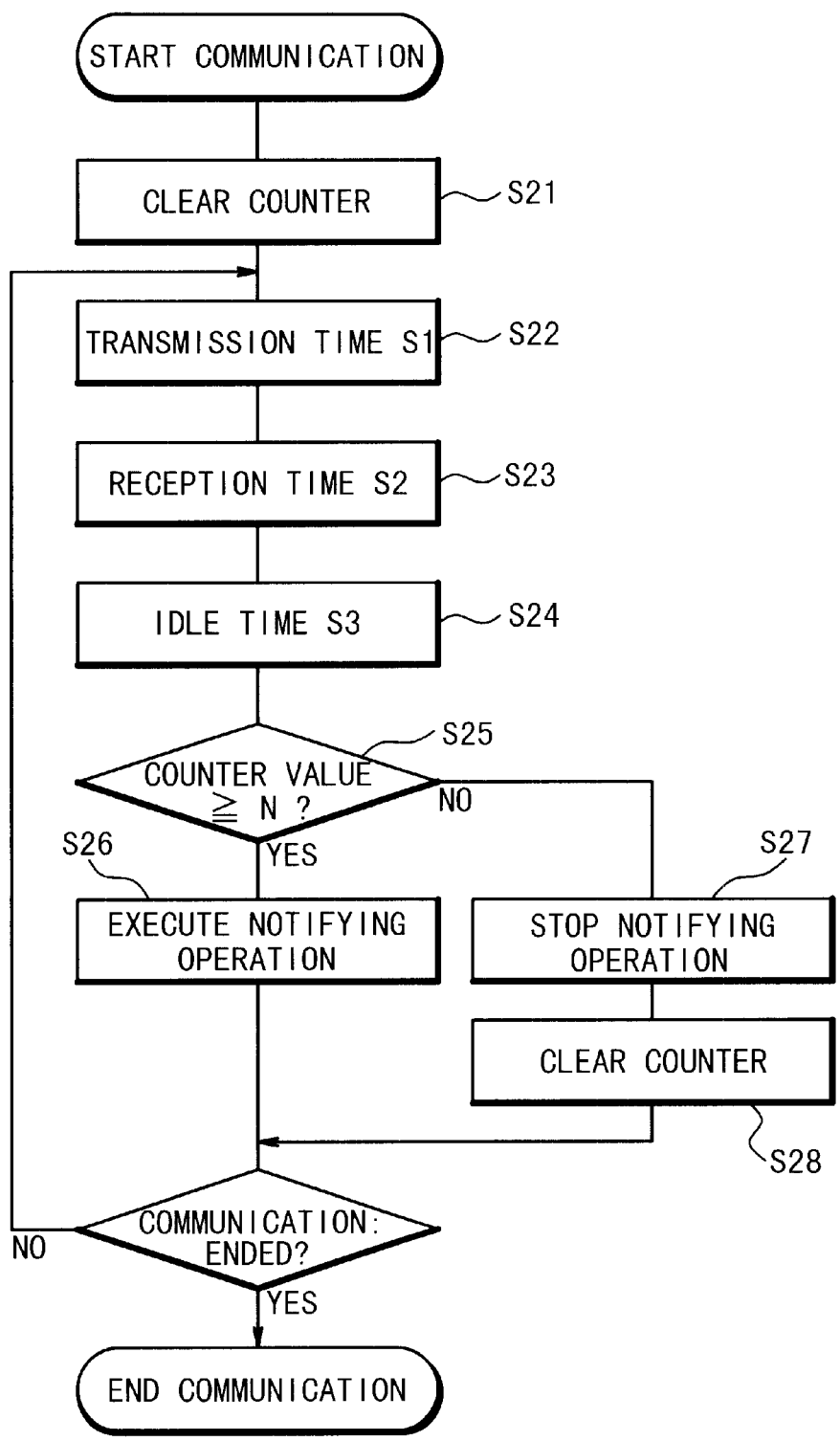
FIG. 16 is a flow chart showing an operation of the portable phone with the detecting unit according to the second embodiment of the present invention.
Figure 17:
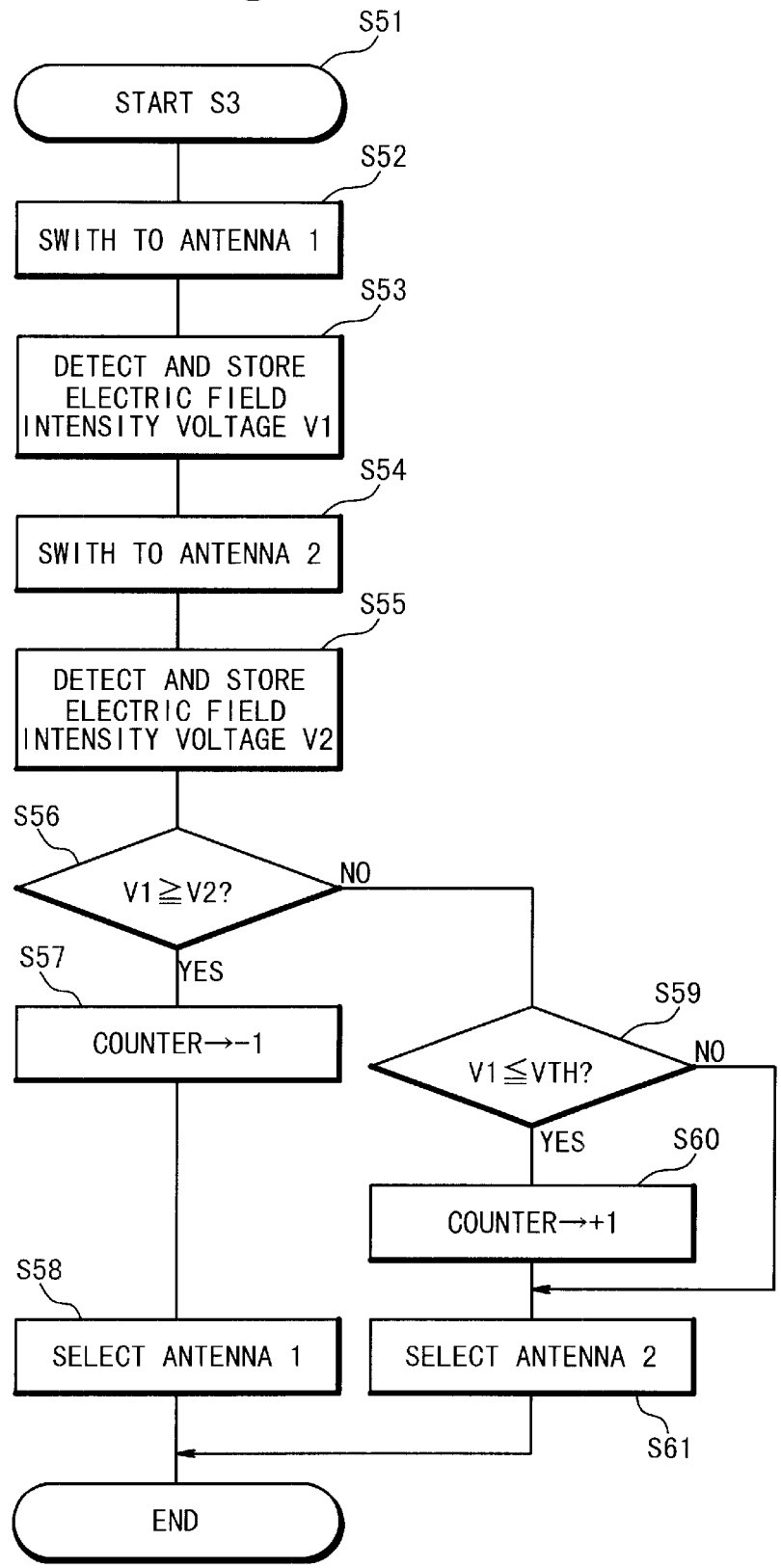
FIG. 17 is a flow chart showing an operation of the portable phone with the detecting unit during an idle time according to the second embodiment of the present invention.

FIG. 16 and FIG. 17 show an antenna human body contact judgment method. When communication is started, the CPU 35 resets a counter (not shown) to N=0. The transmission time S1, the reception time S2, and the idle time S3 in FIGS. 2A and 2B are repeated in the steps S22 to S24, as in the conventional case.

When the idle time S3 is started as shown in FIG. 17 (Step S51), the CPU 35 selects the first antenna 11a (antenna 1) as the antenna at the step S52 of FIG. 17. The electric field intensity detection voltage V1 corresponding to the electric field intensity E1 of the first antenna 11a is inputted to the CPU 35 as a signal in a step S53. The signal is recorded to a memory (not shown) of the CPU 35.

Next, the CPU 35 selects the second antenna 11b (antenna 2) as the antenna at a step S54 of FIG. 17. The electric field intensity detection voltage V2 corresponding to the electric field intensity E2 of the second antenna 11b is inputted to the CPU 35 as a signal at a step S55. The signal is recorded to the memory of the CPU 35.

The CPU 35 compares the voltage V1 and the voltage V2 in a step S56. When the voltage V1 is equal to or larger than the voltage V2, the counter decrements and makes N=N−1 (step S57) and the CPU 35 selects the first antenna 11a (step S58). That is, when V1≧V2, the first antenna 11a does not contact the human body, or the first antenna 11a gives the reception voltage which is larger than the reception voltage of the second antenna 11b, even if the first antenna 11a contacts the human body. In this case, the CPU 35 selects the first antenna 11a (Step S58). Through this selection, the radio signal is received by the first antenna 11a in a reception timing S2 of the following period, and the CPU 35 gets the demodulated signal from the IF amplifier 52.

Figure 5:
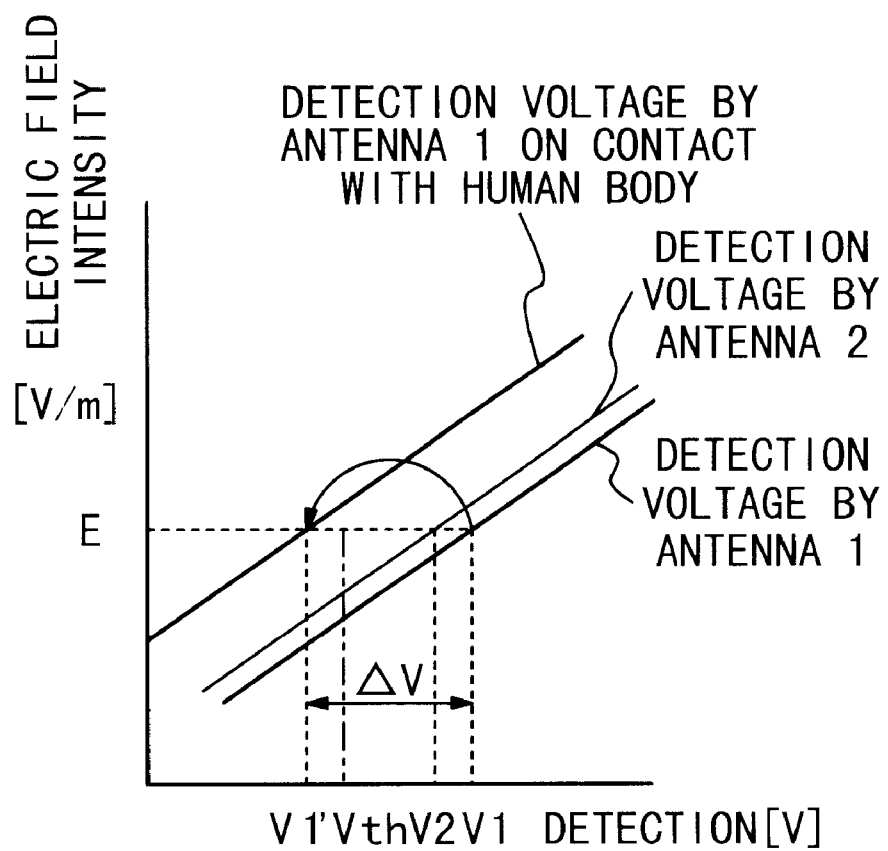
FIG. 5 is a graph showing a relation between the electric field intensity and detection voltages in the conventional portable phone.
Figure 6:
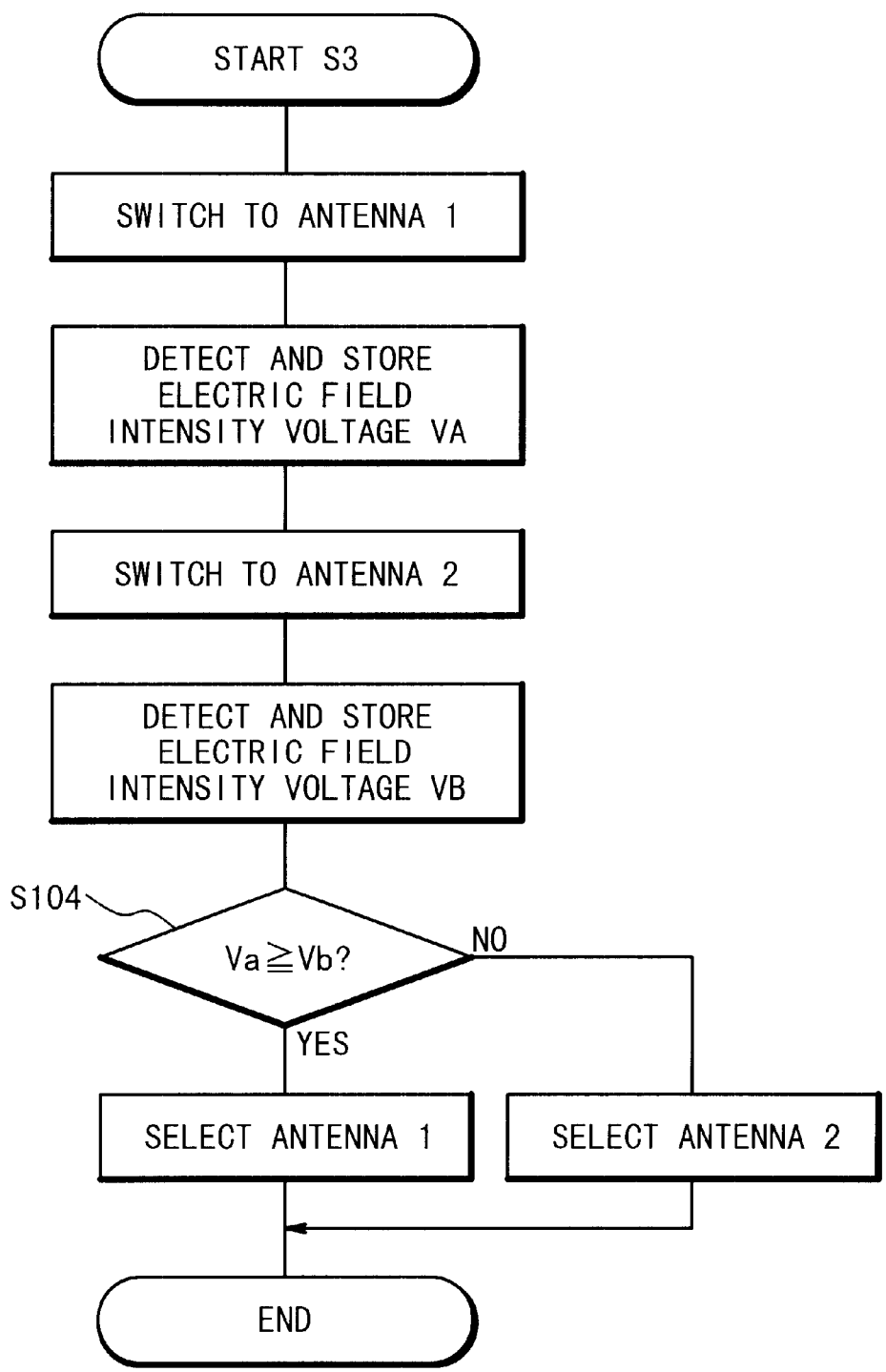
FIG. 6 is a flow chart showing the antenna switching operation of the conventional portable phone.

When V2>V1 in the step S56, the CPU 35 compares the first average voltage V1 and a predetermined voltage value Vth previously stored in the memory of the CPU and peripheral circuit 35. If V1≦Vth (which is different from Vth in FIG. 12) (Step S59), it is determined that the transmission performance is degraded due to the contact of the antenna with the human body or the temporal decrease of the electric field around the first antenna 11a. Then, the counter is incremented to N=N+1 (step S60) and the CPU 35 selects the second antenna 11b. FIG. 5 shows that the first voltage V1 is lower than the predetermined voltage value Vth and is decreased to V1'.

In order to determine that (V2<V1) depends on the contact of the first antenna 11a with the human body or the decrease of the electric field around the first antenna 11a, a previously determined theoretical value or experimental value of the counter value N is stored in the memory of the CPU and peripheral circuit 35. Such a counter value corresponds to the value when the second antenna 11b is selected for a predetermined time or longer time, and when the time continues for which the first antenna 11a contacts the human body so that the detection voltage falls remarkably as less as Vth or below.

When the second antenna 11b is selected (Step S61), the demodulated signal 38 which IF amplifier 52 outputs based on the reception signal received by the second antenna 11b is inputted to the CPU 35.

As the show in FIG. 16, if the counter value becomes equal to or larger than N, the notifying operation is executed in a step S25 (Step S26). If the counter value becomes smaller than N while the notifying operation is executed, the notifying operation is stopped (Step S27). If the notifying operation is stopped, the CPU 35 resets a counter value to zero (Step S28).

FIG. 5 shows a relation between the electric field intensity E around the antenna, the electric field intensity detection voltage V outputted from the IF amplifier 52. This relation is a linear generally. When the antenna does not contact with the human body, the electric field intensity detection voltage V1 corresponding to the first antenna 11a is set to be slightly higher than the electric field intensity detection voltage V2 corresponding to the second antenna 11b, when they are compared in the same electric field intensity. If there is the human body contact, the electric field intensity detection voltage V1 corresponding to the first antenna 11a quickly decreases even in the same electric field intensity. It would be valid to consider that such quick decrease is caused by the human body contact and in this case, and it is desirable that the notifying operation is carried out.

The electric field intensities around the first antenna 11a and the second antenna 11b changes mainly in accordance with the time and the movement speed of the portable phone holder. Also, both the antennas are arranged at the positions with no correlation in the portable phone. Therefore, if the electric field intensities of both the antennas are detected at a predetermined timing, and an antenna with the larger detection value is selected, the degradation of the transmission performance can be prevented. However, if the human body contact happens, the such selection becomes empty. According to the present invention, the contact or the possibility of the contact is notified to the user so as not to make the selection empty.

Figure 18:
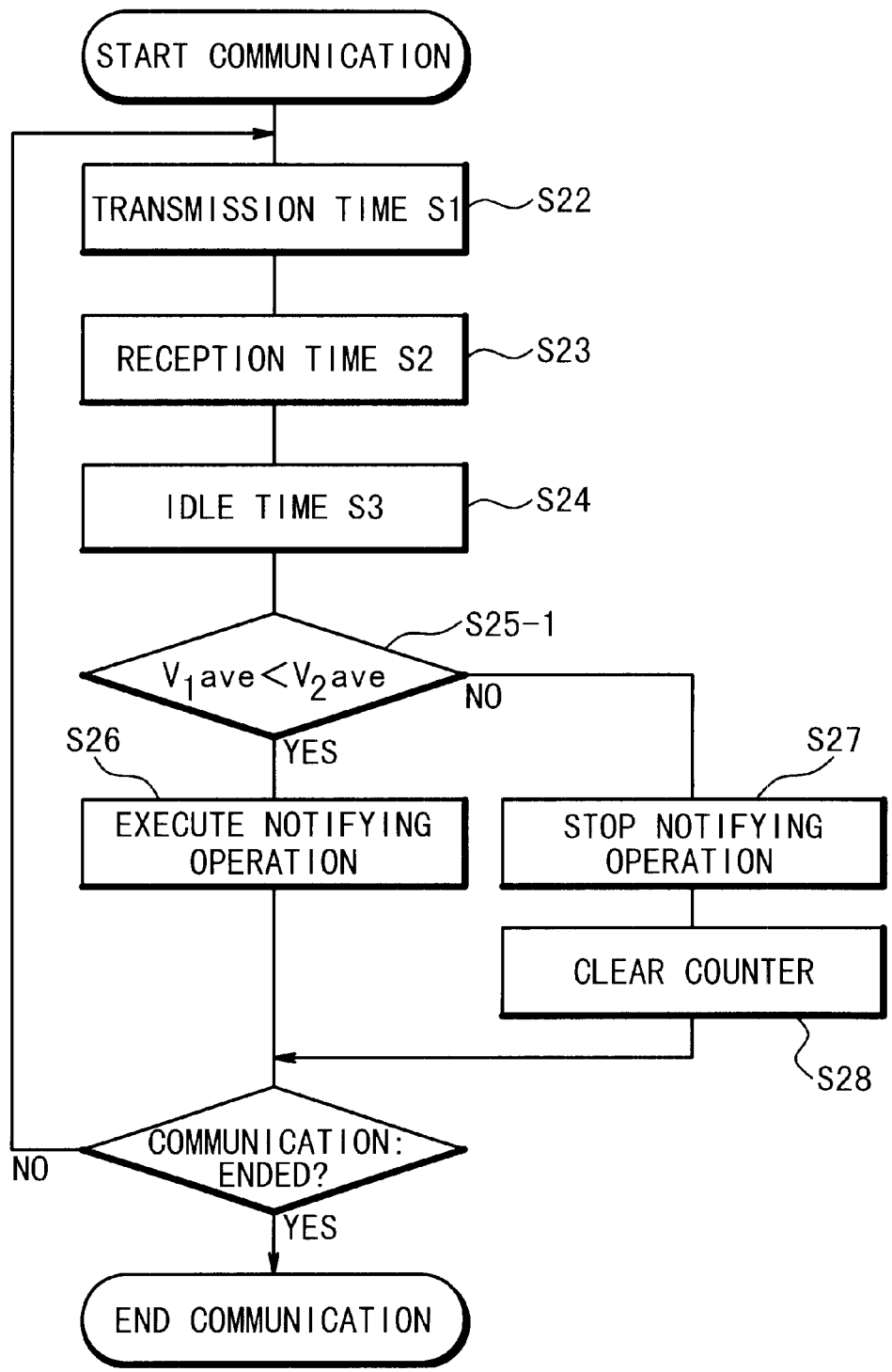
FIG. 18 is a flow chart showing an operation of the portable phone with the detecting unit according to a third embodiment of the present invention.
Figure 19:
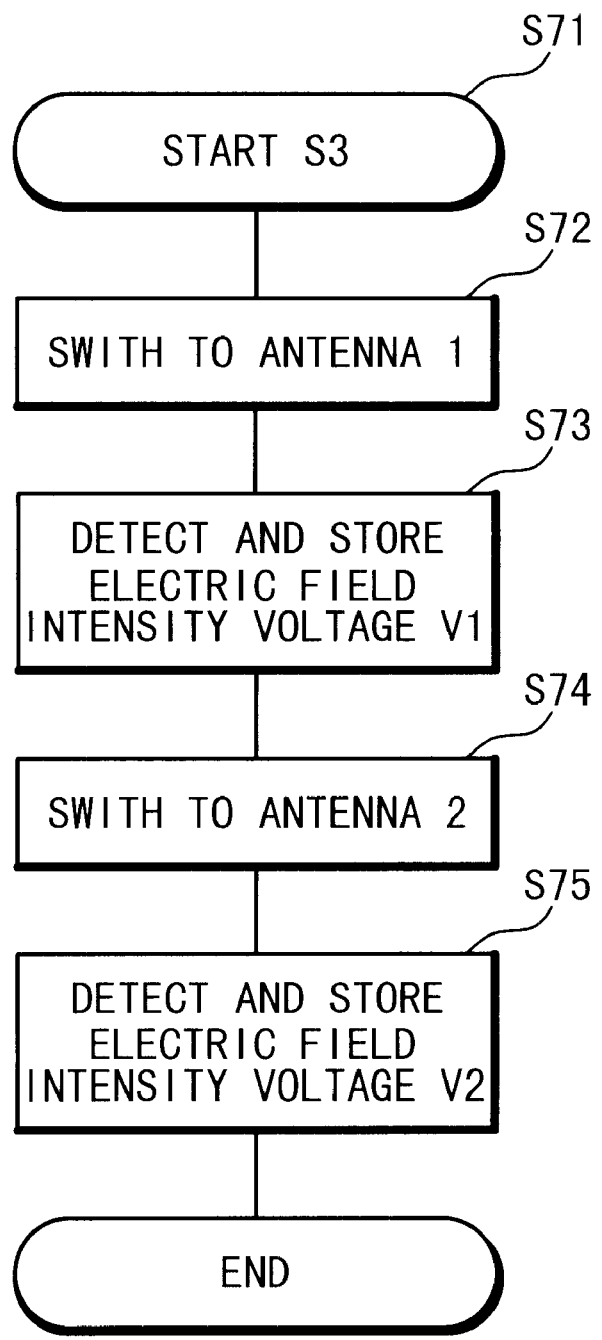
FIG. 19 is a flow chart showing an operation of the portable phone with the detecting unit during an idle time according to the third embodiment of the present invention.

FIG. 18 and FIG. 19 show an antenna human body contact judgment method in the third embodiment. The portable phone in the third embodiment has the same structure of the second embodiment.

When communication is started, the transmission time S1, the reception time S2, and the idle time S3 in FIGS. 2A and 2B are repeated in the steps S22 to S24, as in the conventional case.

When the idle time S3 is started as shown in FIG. 19 (Step S71), the CPU 35 selects the first antenna 11a (antenna 1) as the antenna at the step S72 of FIG. 17. The electric field intensity detection voltage V1 corresponding to the electric field intensity E1 of the first antenna 11a is inputted to the CPU 35 in a step S53. The CPU and peripheral circuit 35 calculates an average of already stored the electric field intensity detection voltages V1 and the newly detected electric field intensity detection voltage V1 and stores in the memory (not shown) of the CPU and peripheral circuit 35 (step S73).

Next, the CPU 35 selects the second antenna 11b (antenna 2) as the antenna at a step S74 of FIG. 19. The electric field intensity detection voltage V2 corresponding to the electric field intensity E2 of the second antenna 11b is inputted to the CPU 35 at a step S75. The CPU and peripheral circuit 35 calculates an average of already stored the electric field intensity detection voltages V2 and the newly detected electric field intensity detection voltage V1 and stores in the memory (not shown) of the CPU and peripheral circuit 35 (step S75).

As the show in FIG. 18, if the average electric field intensity detection voltage V1ave becomes equal to or larger than the average electric field intensity detection voltage V2ave, the first antenna 11a is selected and the notifying operation is executed in a step S25 (Step S26). If the average electric field intensity detection voltage V1ave becomes smaller than the average electric field intensity detection voltage V2ave while the notifying operation is executed, the notifying operation is stopped (Step S27) and the second antenna 11b is used.

It should be noted that the electric field intensities V1 and V2 are compared in the second embodiment, and the averages of the electric field intensities V1ave and V2ave. However, in the second embodiment, averages of the intensities V1 and V2 may be calculated at the step S53 and S55 (FIG. 17) and compared with each other at the step S56, as in the third embodiment.

In the portable phone with the detecting unit, the contact of the antenna with the user during the communication is notified to the user so that the user is made it possible to communicate at an optimal position, resulting an effect in the improvement of the transmission performance.

What is claimed is:

1. A portable phone comprising:
  an antenna;
  a detecting circuit detecting decrease of an electric field intensity around said antenna, and generating a notice signal based on the detecting result;
  a notifying section notifying said user of contact of said antenna with said user in response to said notice signal, said detecting circuit detecting impedance change of said antenna and detecting the contact of said antenna with said user based on the detected impedance;

a transmitting circuit;

a receiving circuit;

a high frequency switch selectively connecting said antenna to one of said receiving circuit and said transmitting circuit; and a circulator connecting said high frequency switch with one of said detecting circuit and said transmitting circuit.

2. A portable phone according to claim 1, wherein said circulator includes a 3-input and 1-output circuit, wherein said detecting circuit is connected with said high frequency switch but is not connected with said transmitting circuit, and said transmitting circuit is connected with said high frequency switch but is not connected with said detecting circuit, and said high frequency switch is connected with said detecting circuit but is not connected with said transmission circuit.

3. A portable phone according to claim 1, wherein said notifying section includes at least one of a vibrator, a speaker and an LED.

4. A portable phone according to claim 1, wherein said detecting circuit stops the generation of said notice signal when said antenna is separated from said user, or when said electric field intensity is increased.

5. A portable phone according to claim 1, wherein said detecting circuit detects said electric field intensity around said antenna, and generates said notice signal when the detected electric field intensity is lower than a reference electric field intensity.

6. A portable phone according to claim 5, further comprising an additional antenna, and wherein said detecting circuit detects an electric field intensity around said additional antenna, and uses the detected electric field intensity around said additional antenna as said reference electric field intensity.

7. A portable phone according to claim 5, wherein said detecting circuit detects said electric field intensity around said antenna and said reference electric field intensity for each of a plurality of transmission frames, and calculates a difference between the number of said electric field intensities equal to or larger than said reference electric field intensities and the number of said electric field intensities smaller than said reference electric field intensities, and generates said notice signal when said calculated difference is equal to or larger than a predetermined value.

8. A portable phone according to claim 7, further comprising an additional antenna, and wherein said detecting circuit detects an electric field intensity around said additional antenna, and uses the detected electric field intensity around said additional antenna as said reference electric field intensity.

9. A portable phone according to claim 7, wherein said detecting circuit includes a counter, and wherein said detecting circuit counts up said counter when said electric field intensity is equal to or larger than said reference electric field intensity, and counts down said counter when said electric field intensity is smaller than said reference electric field intensity.

10. A portable phone according to claim 7, wherein said detecting circuit includes a counter, and wherein said detecting circuit counts up said counter when said electric field intensity is equal to or larger than said reference electric field intensity, and counts down said counter when said electric field intensity, is smaller than said reference electric field intensity, and when said electric field intensity is equal to or smaller than a reference value.

11. A portable phone according to claim 5, wherein said detecting circuit detects said electric field intensities around said antenna and said reference electric field intensities over a plurality of transmission frames, and calculates a first average of said detected electric field intensities and a second average of said detected reference electric field intensities, and generates said notice signal when said first average is lower than said second average.

12. A portable phone according to claim 11, further comprising an additional antenna, and wherein said detecting circuit detects an electric field intensity around said additional antenna, and uses the detected electric field intensity around said additional antenna as said reference electric field intensity.

13. A method of notifying degradation of communication quality in a portable phone said method comprising:

detecting at least one of contact of an antenna with a user of said portable phone and decrease of an electric field intensity around said antenna;

generating a notice signal based on the detecting result;

notifying that said antenna contacts said user, to said user in response to said notice signal;

detecting impedance change of said antenna;

detecting that said antenna contacts said user, based on the detected impedance change;

detecting said electric field intensity around said antenna;

generating said notice signal when the detected electric field intensity is lower than a reference electric field intensity;

detecting said electric field intensity around said antenna and said reference electric field intensity for each of a plurality of transmission frames;

calculating a difference between the number of said electric field intensities equal to or larger than said reference electric field intensities and the number of said electric field intensities smaller than said reference electric field intensities; and generating said notice signal when said calculated difference is equal to or larger than a predetermined value.

14. A method according to claim 13, wherein said notifying includes:

notifying the contact of said antenna with said user by use of at least one of a vibrator, a speaker and an LED.

15. A method according to claim 13, wherein said detecting includes:

detecting an electric field intensity around an additional antenna to use the detected electric field intensity around said additional antenna as said reference electric field intensity.

16. A method according to claim 13, wherein said detecting includes:

counting up a counter when said electric field intensity is equal to or larger than said reference electric field intensity; and counting down said counter when said electric field intensity is smaller than said reference electric field intensity.

17. A method according to claim 13, wherein said detecting includes:

counting up a counter when said electric field intensity is equal to or larger than said reference electric field intensity; and counting down said counter when said electric field intensity is smaller than said reference electric field intensity, and when said electric field intensity is equal to or smaller than a reference value.

18. A method of notifying degradation of communication quality in a portable phone, said method comprising:

detecting at least one of contact of an antenna with a user of said portable phone and decrease of an electric field intensity around said antenna;

generating a notice signal based on the detecting result;

notifying that said antenna contacts said user, to said user in response to said notice signal;

detecting impedance change of said antenna;

detecting that said antenna contacts said user, based on the detected impedance change;

detecting said electric field intensity around said antenna;

generating said notice signal when the detected electric field intensity is lower than a reference electric field intensity;

detecting said electric field intensities around said antenna and said reference electric field intensities over a plurality of transmission frames;

calculating a first average of said detected electric field intensities and a second average of said detected reference electric field intensities; and generating said notice signal when said first average is lower than said second average.

* * * * *